(12) United States Patent
Huang et al.

(10) Patent No.: US 6,407,595 B1
(45) Date of Patent: Jun. 18, 2002

(54) DIGITAL CLOCK THROTTLING MEANS

(75) Inventors: Hung-Ju Huang, Taipei; Hung-Ta Pai, Taichung, both of (TW)

(73) Assignee: Silicon Integrated Systems Corp. (TW)

( * ) Notice: Subject to any disclaimer, the term of this patent is extended or adjusted under 35 U.S.C. 154(b) by 0 days.

(21) Appl. No.: 09/542,938

(22) Filed: Apr. 4, 2000

(51) Int. Cl.[7] ............................................. H03B 19/00
(52) U.S. Cl. ................... 327/114; 327/176; 327/105; 327/166; 375/239
(58) Field of Search ................... 327/113, 114, 327/172–176, 165, 166, 105–107, 355, 361; 375/371, 362, 363–366, 238, 239; 331/40

(56) References Cited

U.S. PATENT DOCUMENTS

| | | | | |
|---|---|---|---|---|
| 4,514,696 A | * | 4/1985 | Genrich | 327/107 |
| 4,580,277 A | * | 4/1986 | Angello et al. | 375/308 |
| 5,050,195 A | * | 9/1991 | Munter | 375/373 |
| 5,808,691 A | * | 9/1998 | Malcolm et al. | 348/537 |
| 6,233,296 B1 | * | 5/2001 | Hofman | 375/375 |

\* cited by examiner

*Primary Examiner*—Toan Tran
*Assistant Examiner*—Minh Nguyen
(74) *Attorney, Agent, or Firm*—Powell Goldstein; Frazer & Murphy LLP

(57) ABSTRACT

A digital clock throttling device, for gating a clock signal of a circuit, at least includes an accumulator and a gating circuit. The accumulator responsive to a throttling value generates a first output signal. The first output signal is divided into a throttling signal with a most significant bit and a feedback signal with rest bits of the first output signal except for the most significant bit. The feedback signal is sent to the accumulator back for accumulating to the throttling value as the first output signal. The gating circuit coupling with the accumulator responsive to the throttling signal and clock signal gates out some clock cycles of the clock signal, thereby providing a gated clock signal in an adjusted frequency.

3 Claims, 5 Drawing Sheets

DIGITAL CLOCK THROTTLING MEANS

FIELD OF THE INVENTION

This invention relates to a digital clock throttling means, and more specifically to a digital clock throttling means employed in a graphics chip for responsive to an input value to gate a clock signal (CLK) of the graphics chip.

BACKGROUND OF THE INVENTION

With the improvement of the VLSI fabricating technology and the raising demand of performance, an integrated circuit has become more compact and complicated than ever. For example, a layout of graphics chip becomes more complicated, due to the requirement of three-dimensional graphics. Although the highly integrated chips provide strong calculating performance, they may cause some undesired issues. One of the most important issues is the high power consumption, due to the high integration of the chips. Usually, the high power consumption accompanies a thermal-raising problem. For some portable devices, such as laptop computers and personal digital assistants, the thermal-raising problem would get even worse, because of their limited spaces, which restrict the implantation of cooling means, unable to transfer heat out of them. Therefore, it sometimes sees that the chips, in the portable devices burn out for lack of a suitable temperature control scheme.

One of the conventional methods of reducing the power consumption in an integrated circuit is to turn off some functions inherent in the integrated circuit by software or hardware. Since some functions of the integrated circuit have been suspended, it would be performed under a less-loaded state, thereby reducing its total thermal production. Although the conventional method reduces the thermal production by suspending some functions of the integrated circuit, it causes some serious disadvantages. For example, in a graphics chip, if some functions were suspended, the pictures on the display would be interrupted. When the graphics chip is employed to support a computer game, the pictures of the game would be displayed discontinuously, due to the suspension of some functions. Therefore, the conventional method may avoid the high temperature problem of the integrated circuit, but might degrade the performance of the integrated circuit.

Another conventional method employs a phase-locked loop (PLL) circuit to change the clock speed of the integrated circuit, i.e. clock throttling. However, the latency of using phase-locked loop circuit to reduce the clock speed and bring it back is large. Thus, it's also unacceptable to be implanted in some integrated circuits requiring high performance, such as graphics chips.

SUMMARY OF THE INVENTION

An objective of this invention is to provide a digital clock throttling means for adjusting a frequency of clock signal of an integrated circuit.

Another objective of this invention is to provide a temperature controlling apparatus employing the digital clock throttling means for adjusting a frequency of clock signal of an integrated circuit in response to its temperature.

Yet another objective of this invention is to provide a power controlling apparatus employing the digital clock throttling means for adjusting a frequency of clock signal of an integrated circuit in response to its loading.

This invention discloses a digital throttling means including an accumulator and gating circuit. The accumulator responses to an input throttling value to generate a throttling signal. The gating circuit responses to the throttling signal to gate out some clock cycles of an integrated circuit the digital clock throttling means implants in, therefore, changing the frequency of the clock signal as well as controlling the power consumption and thermal production. For better applications, the digital clock throttling means can be implanted in a temperature controlling apparatus and power controlling apparatus embedded in any integrated circuits, such as graphics chips.

DETAILED DESCRIPTION OF THE PREFERRED EMBODIMENT

In digital devices, most circuits are triggered by clock signals. The frequency of the clock signal is measured by counting its positive edges or negative edges for a period of time. Because the frequency of the clock signal relates to the thermal production of a circuit, controlling the thermal production can be achieved by implanting a means throttling the clock signal to adjust the frequency. The throttling here means to suspend some clock cycles of the clock signal so that the clock cycles are changes between states, i.e. 0 state and 1 state. Therefore, throttling changes the number of the positive edges or negative edges at the period of time, namely, changing the frequency of the clock signal. The invention discloses a digital throttling means embedding in an integrated circuit for throttling the clock signal, thereby automatically controlling its thermal production. For clearly illustrating the invention, a preferred embodiment of the clock throttling means is proposed as follows.

Figure 1:
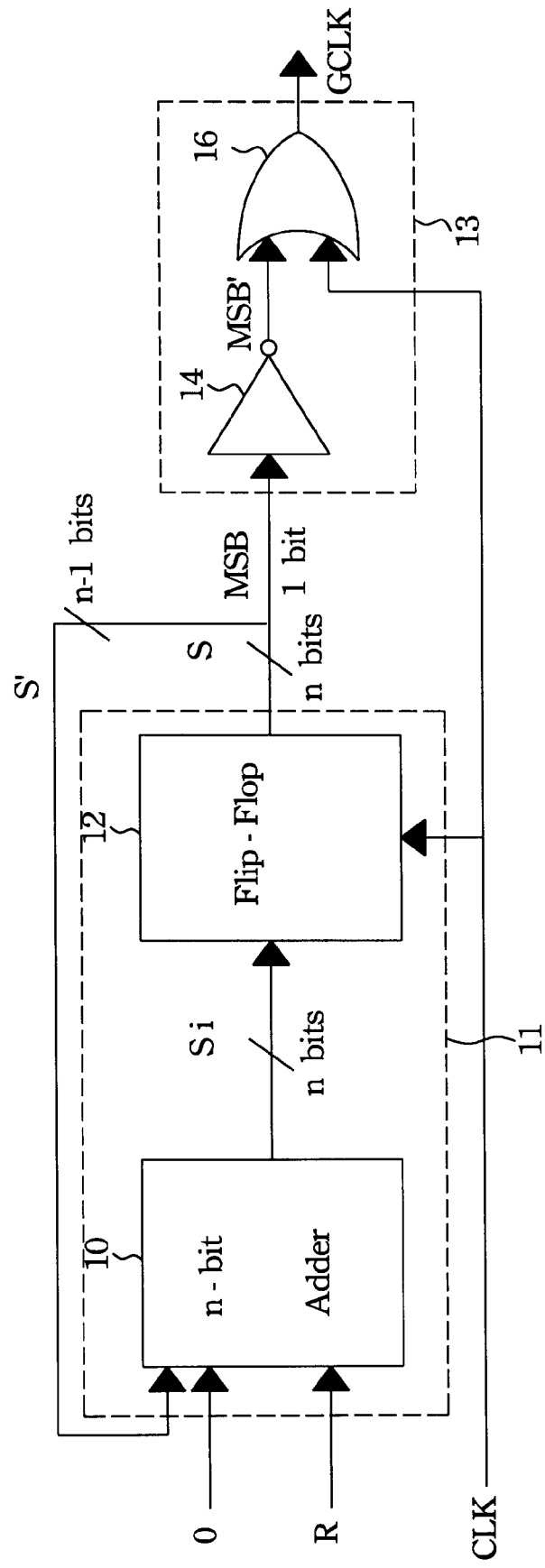
FIG. 1 shows a logic diagram for the present digital clock throttling means.

FIG. 1 shows a logical diagram of the clock throttling means, which includes an accumulator 11 and gating circuit 13. The accumulator 11 composed of an n-bit adder 10 and flip-flop 12 responds to a throttling value R to generate a first output signal S with n bits of digital information. The most significant bit, i.e. the head bit of the n bits digital information, sends directly to the gating circuit as a throttling signal MSB. The rest bits of the first output signal S, i.e. the bits except for the head bit of the n bits of digital information, input back to the accumulator 11 as a feedback signal S' and accumulate with the throttling value R by the n-bit adder 10. Thereafter, the n-bit adder 10 sends an internal output signal $S_i$ to the flip-flop 12 for temporary maintenance, outputting the first output signal S as the aforementioned manner.

The gating circuit 13 includes an inverter 14 and OR gate 16. The inverter 14 coupling with the flip-flop 12 receives the throttling signal MSB and transforms it into an inverted throttling signal MSB. The OR gate 16 coupling with the inverter 14 responds to the inverted throttling signal MSB and clock signal CLK for gating out some clock cycles of the clock signal CLK, thereby providing a gated clock signal GCLK in an adjusted frequency. When the inverted throttling signal MSB appears to a 1 state and the clock signal CLK appears to a 0 state at a concurrent clock cycle, after the calculating of the OR gate 16, the clock cycle of the gated clock signal GCLK is at the 1 state. Since the gated clock signal GCLK suspends a raising edge and descending edge at the very clock cycle, the frequency of the gated clock signal GCLK is slower than that of the clock signal CLK. Therefore, employing the gated clock signal GCLK triggering any integrated circuits ensures a less thermal production than that prior to the processing of the clock signal by the digital clock throttling means.

Figure 2:
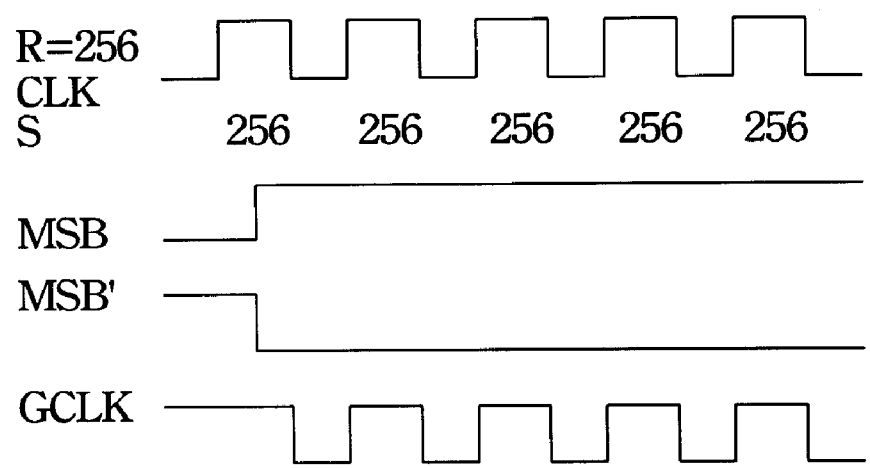
FIG. 2 shows a timing diagram for the present digital clock throttling means with a first throttling value as an input signal.
Figure 3:
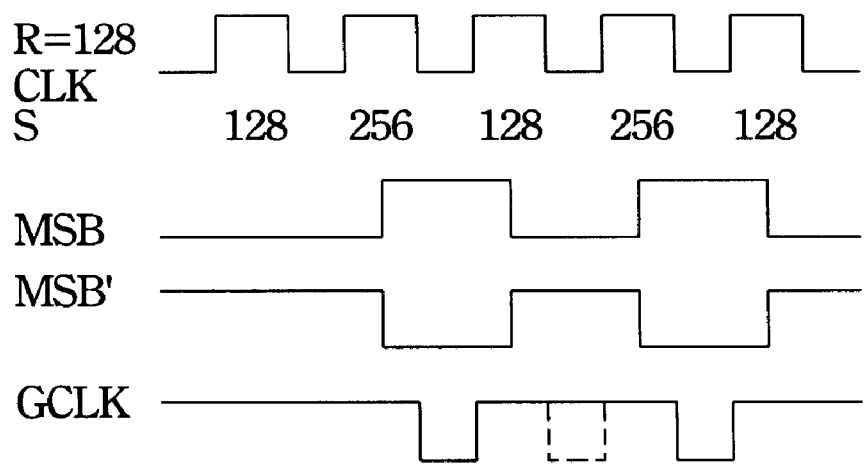
FIG. 3 shows a timing diagram for the present digital clock throttling means with a second throttling value as an input signal.

FIG. 2 and FIG. 3 illustrate timing diagrams of the digital clock throttling means. Referring to FIG. 2 accompanying with FIG. 1, as a preferred embodiment, a 9-bit adder 10 receives the throttling value R, which equals to 256. Considering the first calculating cycle for the accumulator 11, the first output signal S equals to the throttling value R, 256, representing in binary as 100000000, in which the most significant bit of the first output signal S is 1. Therefore, the throttling signal MSB sending to the inverter 14 is at the 1 state. In addition, because the rest 8 bits of the first output signal S, without the head bit, are all equal to zero, the first output signal S form the 9-bit adder 10 is always equal to the throttling value R, namely 256, and the throttling signal MSB always at the 1 state. Thereafter, the inverter 14 transforms the throttling signal MSB into the inverted throttling signal MSB with a waveform always in the 0 state. After the OR calculating for the clock signal CLK and inverted clock signal GCLK, the OR gate 16 outputs the gated clock signal GCLK in the same frequency with the clock signal CLK.

Further referring to FIG. 3 and FIG. 1, when the throttling value R equals to 128, 010000000 in binary, the first output signal alternates between 128 and 256 in every other cycle. Similarly, the throttling signal MSB and the inverted throttling signal MSB alternate between the 1 state and 0 state in every other cycle, as shown in FIG. 3. When the inverted throttling signal MSB appears to the 1 state, it gates out the concurrent clock cycle of the clock signal CLK as the gated clock signal GCLK, namely reducing the raising edges or descending edges of the clock signal CLK to slow its frequency.

FIG. 2 and FIG. 3 illustrating the timing diagrams of a digital clock throttling means in a 9-bit bandwidth, however, it could be implanted in any integrated circuits in a more generic terms. The frequency of the gated clock signal GCLK can be shown as:

$$F_{GCLK} = \frac{2^{n-1} - m}{2^{n-1}} F_{CLK} \quad (1)$$

wherein:

$F_{GCLK}$ is the frequency of the gated clock signal
$F_{CLK}$ is the frequency of the clock signal
n is the bandwidth of the digital throttling means
m is the throttling value R As understood in formula (1), the throttling ratio between the frequencies of the gated clock signal and clock signal can be adjusted by changing the throttling value m. Thus, an integrated circuit can acquire its preferable throttling ratio by applying the aforementioned formula.

Figure 4:
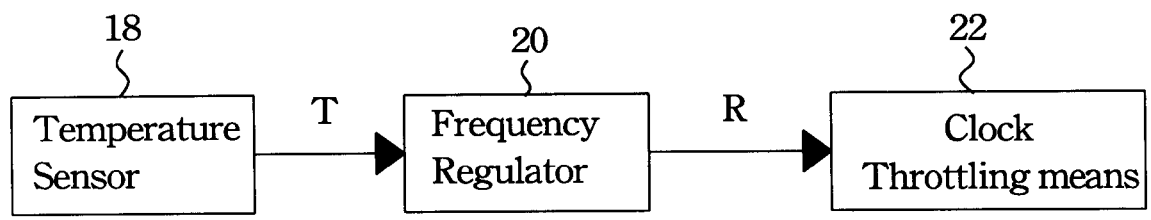
FIG. 4 shows a block diagram of a temperature controlling apparatus embedded in an integrated circuit.

FIG. 4 illustrates a block diagram of a temperature controlling apparatus with the present digital clock throttling means embedded in an integrated circuit, such as a graphics chip, for automatically adjusting the frequency of the integrated circuit in response to its temperature. The temperature controlling apparatus is composed of a temperature sensor 18, frequency regulator 20, and clock throttling means 22. The temperature sensor 18 detects the temperature of the integrated circuit to provide a temperature signal T. The frequency regulator 20 coupling with the temperature sensor responds to the temperature signal T to determine a throttling value R for adjusting the frequency of the clock signal. The clock throttling means 22 coupling with the frequency regulator 20 responsive to the throttling value R gates out some clock cycles of the clock signal, thereby adjusting the frequency of the clock signal.

Figure 5:
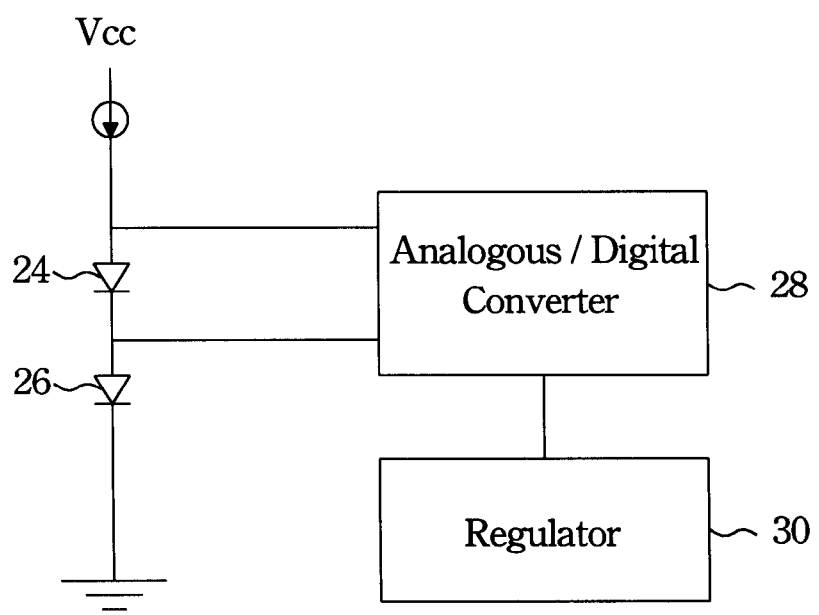
FIG. 5 shows a block diagram of a temperature sensor employed in the temperature controlling apparatus.

FIG. 5 illustrates a preferred embodiment of the temperature sensor 18 (see FIG. 4). The temperature sensor includes diodes 24, 26, analogous/digital converter 28, and register 30. The diodes 24, 26 responsive to temperature change impedance of the temperature sensor. When the temperature sensor is biased with a reference voltage Vcc, the voltage level of its circuit sensor varies, due to the change of the impedance. The analogous/digital converter 28 digitizes the voltage level of the temperature sensor as the temperature signal T, and temporarily stores in the register 30.

Figure 6:
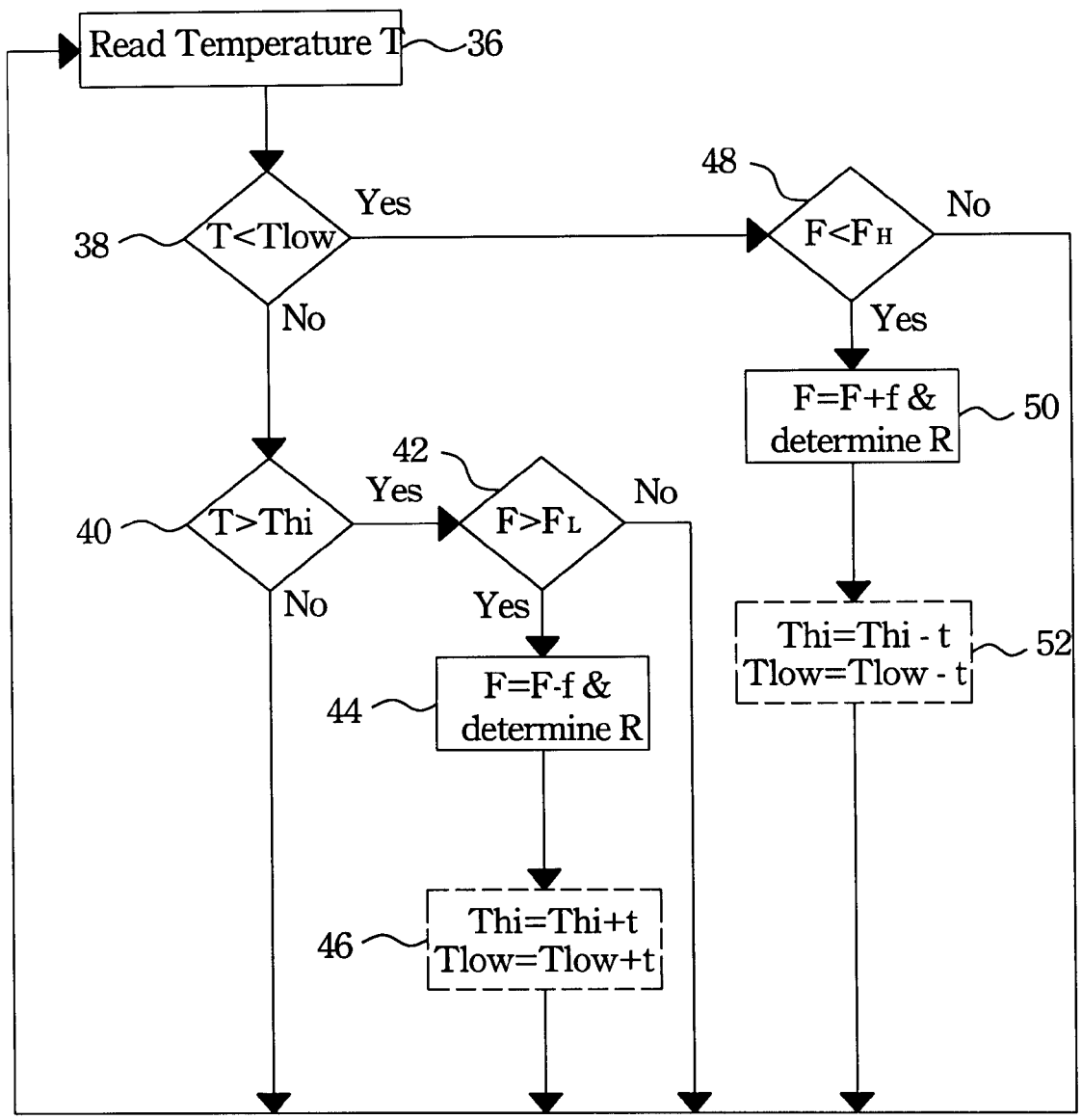
FIG. 6 shows a flow chart of an algorithm for determining a throttling value.

When the frequency regulator 20 (see FIG. 4) receives the temperature signal T, it follows a series processes to determine the throttling value R. FIG. 6 shows a preferred embodiment of the determination processes. Initially, the frequency regulator 20 reads the temperature signal T sent from the temperature sensor 18 (see FIG. 4), as shown in step 36. A judgement checks whether the temperature signal T falling in a range predetermined by a minimum allowable temperature of the integrated circuit $T_{low}$ and maximum allowable temperature of the integrated $T_{hi}$. When the temperature signal is lower than the minimum allowable temperature $T_{low}$, as shown in step 38, the judgement of step 48 checks whether the frequency of the clock signal F is lower than a predetermined maximum allowable frequency $F_H$. If the frequency F is higher than the maximum allowable frequency $F_H$, namely that the frequency F can't be adjusted even higher, the process goes to the step 36; if the frequency F is lower than $F_H$, namely that the frequency F can be adjusted higher, the frequency F is raised with an increment f by increasing the throttling value R, and then determining the throttling value R, as shown in step 50. For instance, if the throttling value R changes from 128 to 129, the frequency F is accordingly changed form $128/2^{n-1}F_H$ to $129/2^{n-1}F_H$. That is, the increment f equals to $1/2^{n-1}F_H$.

Likewise, when the temperature signal is higher than the maximum allowable temperature $T_{hi}$, as shown in step 40, the judgement of step 42 checks whether the frequency F is higher than a predetermined minimum allowable frequency $F_L$. If the frequency F is lower than the minimum allowable frequency $F_L$, namely that the frequency F can't be adjusted even lower, the process goes to the step 36; if the frequency F higher than $F_L$, namely that the frequency F can be adjusted lower, the frequency F is reduced with an increment f by decreasing the throttling value R, and then determining the throttling value R, as shown in step 44.

Because the temperature reduction of the integrated circuit lags behind the frequency reduction triggered by the throttling value R that may cause over reduction of the frequency F, a slight temperature shifting step t is introduced as a improved alternative. Starting at step 50, which shows the temperature signal T lower than the minimum allowable temperature $T_{low}$ and the frequency lower than the maximum allowable frequency $F_H$, the range of allowable temperature from $T_{hi}$ to $T_{low}$ is decreased by the shifting step t, as shown in step 52. Likewise, starting at step 44, which shows the temperature signal T higher than the maximum allowable temperature $T_{hi}$ and the frequency higher than the minimum allowable frequency $F_L$, the range of allowable temperature from $T_{hi}$ to $T_{low}$ is increased by the shifting step t, as shown in step 46. Since the range of allowable temperature shifts by a step t, the over reduction of frequency would be avoided. It's noticed that the shifting step t is an alternative design for avoiding the over reduction of frequency, so that it should not be construed as a limitation of the invention.

Figure 7:
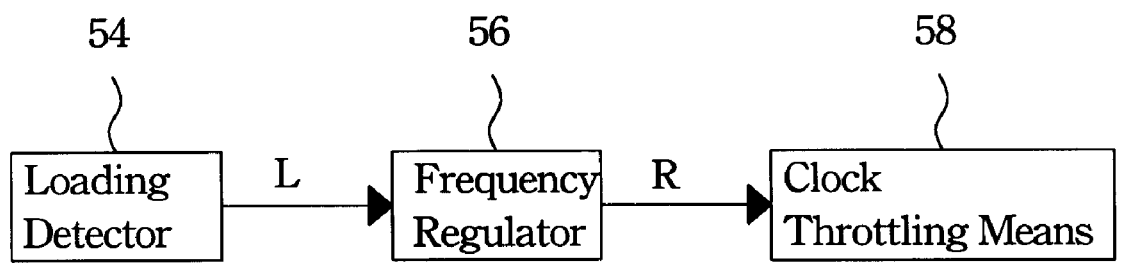
FIG. 7 shows a block diagram of a power controlling apparatus embedded in an integrated circuit.

Turning to FIG. 7, it illustrates a block diagram of a power controlling apparatus embedded in an integrated circuit, such as a graphics chip, for automatically adjusting the frequency of its clock signal by gating out some clock cycles in response to its loading, thereby saving the power consumption. The power controlling apparatus is composed of a loading detector 54, frequency regulator 56, and clock throttling means 58. The loading detector 54 detects the loading of the integrated circuit to provide a loading signal L. The frequency regulator 56 coupling with the loading detector responds to the loading signal L to determine a throttling value R for adjusting the frequency of the clock signal. The clock throttling means 58 coupling with the frequency regulator 56 responsive to the throttling value R gates out. some clock cycles of the clock signal, thereby adjusting the frequency of the clock signal and accordingly saving the power consumption. As a result of the frequency regulator 56 determining the throttling value R by the aforementioned processes and the clock throttling means 58 having been illustrated as before, there is no further discussion for avoiding redundancy.

The present digital clock throttling means is embedded in an integrated circuit so that enabling the integrated circuit to be used in portable devices. In addition, the digital clock throttling means overcomes the high power consumption and thermal production by gating out some clock cycles instead of suspending some functions of the integrated circuit. Therefore, the undesired shortcomings, such as an interruption of a game, could be avoided. Moreover, the digital clock throttling means can further be employed in a temperature controlling apparatus or power controlling apparatus for providing broad applications.

As is understood by a person skilled in the art, the foregoing preferred embodiments of the present invention that are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A digital clock throttling means for regulating a frequency of a clock signal of a circuit, the digital clock throttling means comprising:

an accumulator transmitting an internal output signal responsive to a throttling value for generating a first output signal, the first output signal being divided into a throttling signal with a most significant bit of the first output signal and a feedback signal with rest bits of the first output signal except for the most significant bit, the feedback signal being sent to the accumulator back for accumulating to the throttling value as the first output signal; and a gating circuit coupling with the accumulator responsive to the throttling signal and the clock signal for gating out some clock cycles of the clock signal wherein the gating circuit comprises at least an OR gate, thereby providing a gated clock signal in an adjusted frequency.

2. The digital clock throttling means of claim 1, wherein the accumulator further comprises:

an adder responsive to the throttling value and the feedback signal for generating the internal output signal; and a flip-flop coupling with the adder for receiving the internal output signal to maintain the internal output signal as the first output signal by using the clock signal for a period of time.

3. The digital clock throttling means of claim 1, wherein the gating circuit comprises an inverter coupling with the accumulator and with the OR gate for receiving and inverting the throttling signal into an inverted throttling signal.

* * * * *